Inventors
Emil Grieshaber
Paul S. Shirley
by Parker & Carter
Attorneys

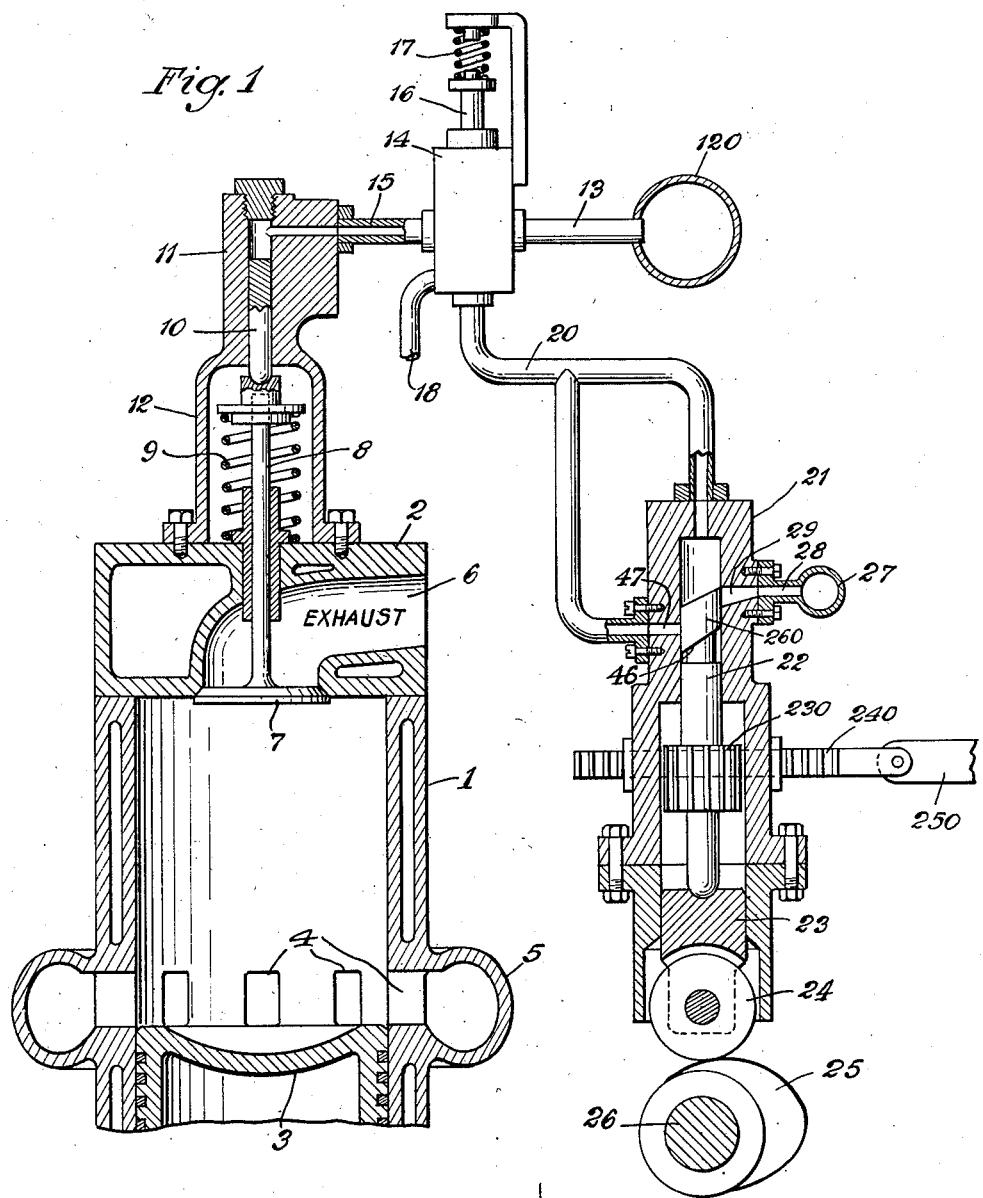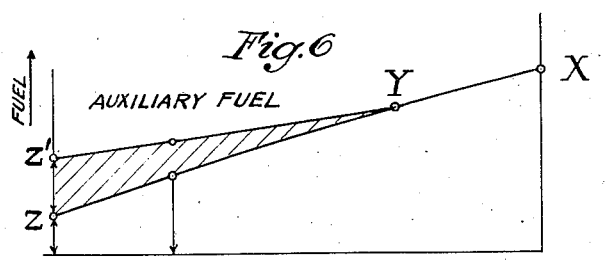

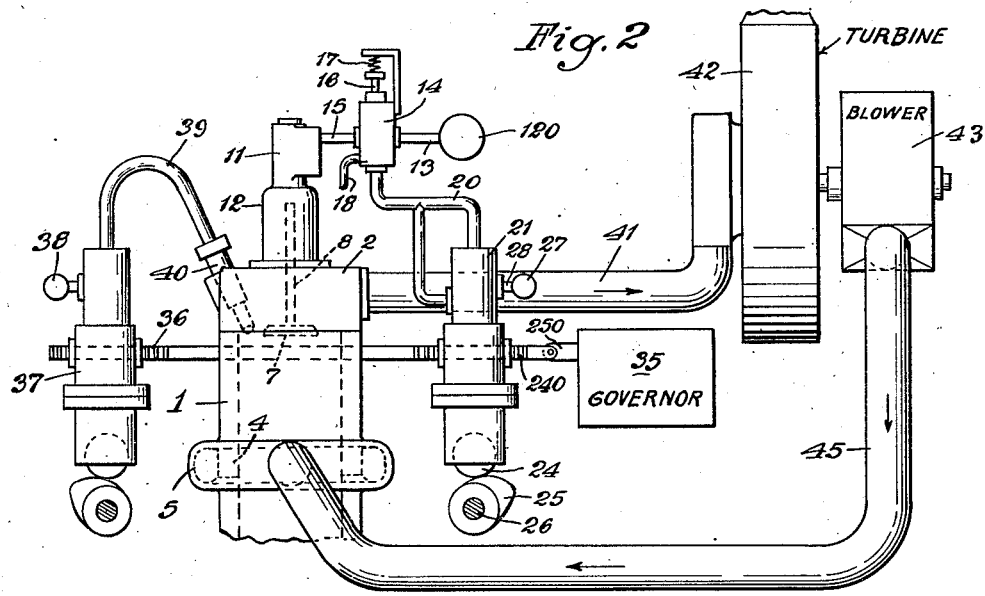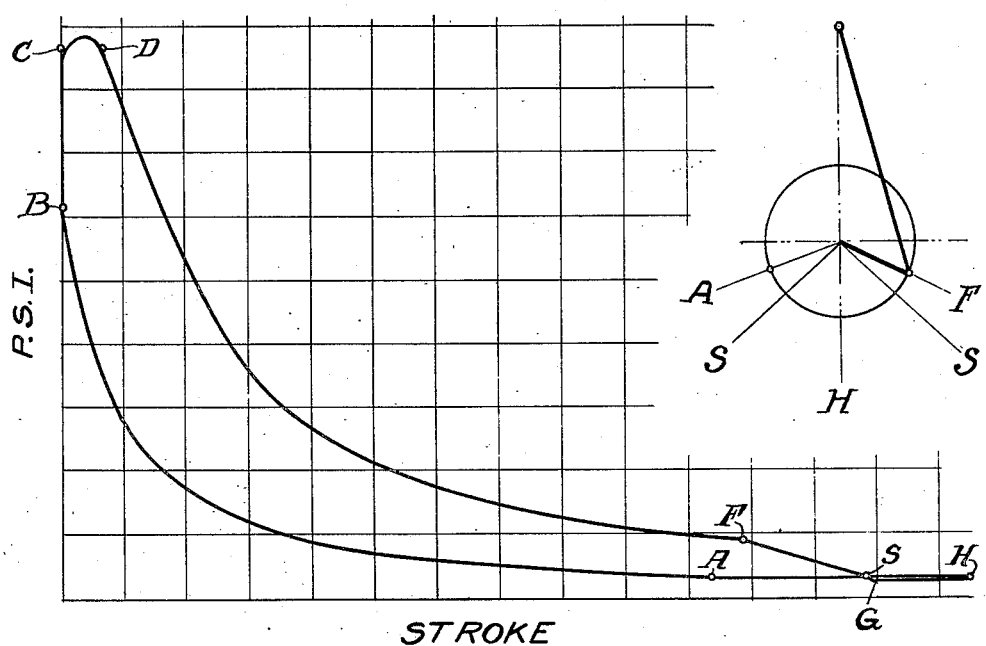

United States Patent Office 2,820,339
Patented Jan. 21, 1958

2,820,339

TURBO-CHARGED INTERNAL COMBUSTION ENGINES AND METHODS OF STARTING AND OPERATING THEM

Emil Grieshaber and Paul S. Shirley, Milwaukee, Wis., assignors to Nordberg Manufacturing Co., Milwaukee, Wis., a corporation of Wisconsin Application March 31, 1952, Serial No. 279,524

11 Claims. (Cl. 60—13)

Our invention relates to improvements in exhaust turbo-charged, two cycle and four cycle internal combustion engines and methods of starting and operating them.

The power generated by the exhaust driven turbine of a turbo-charger, and the amount and pressure of scavenging and supercharging air supplied to an internal combustion engine, depends upon the temperature of, the pressure of, and the mass flow of the exhaust gas. If the products of combustion in the engine cylinder, during the power stroke, are allowed to expand to the maximum, the pressure and temperature of the exhaust gas is at a minimum, work having been done by the gas as it expands to move the piston. Under these circumstances, with exhaust at or near the end of the power stroke, the maximum amount of energy available in the expanding gas has been used to drive the piston and as a result the temperature and pressure of the exhaust gas, delivered to the turbine side of the turbo-charger of an internal combustion engine, are at a minimum. Thus at partial or low loads, or at starting, the energy available in the exhaust gas is not sufficient to deliver enough scavenging and supercharging air to sustain combustion for engine operation.

It is possible to increase the temperature and pressure and mass flow of the exhaust gas discharged to the turbine side of the turbo-charger by opening the exhaust valve or valves earlier than the normal setting. When this is done, the temperature, the pressure, and ultimately the mass flow of the gas are increased, while at the same time more fuel must be burned in the engine, because, having opened the exhaust valve earlier, energy which would have been applied to the piston under ordinary conditions remains in the exhaust gas leaving the cylinder. Therefore, the additional fuel burned compensates for the energy subtracted from the power stroke and supplied to the turbine of the turbo-charger. Such additional fuel further increases the energy available in the exhaust gas to drive the turbine, due to higher temperature, pressure and increased mass flow. Thus even at starting and under low load conditions, the turbocharger is able to provide scavenging and supercharging air adequate to sustain perfect combustion.

After-burners have been used between the exhaust manifold and the turbine in an effort to provide adequate power to drive the turbo-charger, but our invention accomplishes the same result under conditions of maximum rather than minimum efficiency, and without the addition of other auxiliary means.

The invention herein involves such control of the time at which the exhaust valve or valves open as to compensate for variation in load and at the same time insure such supply of air to the cylinders as will provide necessary acceleration factor whereby there will always be in the cylinder air adequate to support sudden increases in the fuel supply for perfect combustion.

As the load falls and the temperature of the exhaust gas falls, we advance the time when the exhaust valve opens so as to compensate for the decreased exhaust gas temperature resulting from the reduction in the amount of fuel burned. This tends to increase the power available to operate the turbo-charger at the expense of reducing the energy applied to the piston. To compensate for such subtraction of energy more fuel is burned. Thus the engine will develop at starting and at low load sufficient power for operation and sufficient energy is also available to operate the turbo-charger. By this double control of time of opening of exhaust valve and amount of fuel supplied to the engine, proper combustion and engine operation are obtained throughout the entire range of operation.

As load falls and as the time of opening the exhaust is advanced, the amount of scavenging and supercharging air available for compression in the engine falls and the point may be reached as load decreases and exhaust lead increases when, in an internal combustion engine, compression pressure and consequent temperature toward the end of the compression stroke will be too low for engine operation. Therefore, it is desirable to advance the time of closing of the exhaust so as to insure that compression will start at an earlier point in the cycle so that the reduced amount of air will nevertheless at the end of the compression stroke be compressed to adequate compression pressures and temperatures. Thus as exhaust opening lead increases, the exhaust must close earlier in the cycle to compensate therefor. The time when the exhaust closes may vary in direct relation to the time of opening or it may vary independently. The thing is that the time of closing be advanced with the time of opening.

Increase in exhaust lead and the introduction of auxiliary fuel may not be sufficient to prevent excessive reduction of the compression pressure in the engine operating cycle. Since excessive reduction of such pressure results in unsatisfactory engine operation and especially with an internal combustion engine may interfere with ignition, such pressure reduction must be limited. Advance of the time of closing of the exhaust causing compression in the cylinder to commence at an earlier period will accomplish this.

For convenience, we illustrate our invention in connection with a two-cycle engine, although it may equally well be used with a four-cycle engine.

Our invention is illustrated more or less diagrammatically in the accompanying drawings, wherein:

Figure 1 is a section through an engine cylinder and control mechanism;

Figure 2 is a diagrammatic showing of the relationship between the engine and the turbo-charger and the governor;

Figure 3 is an indicator card for overload with corresponding crank diagram;

Figure 6 is a fuel curve.

Like parts are indicated by like characters throughout the specification and drawings.

Figure 4:
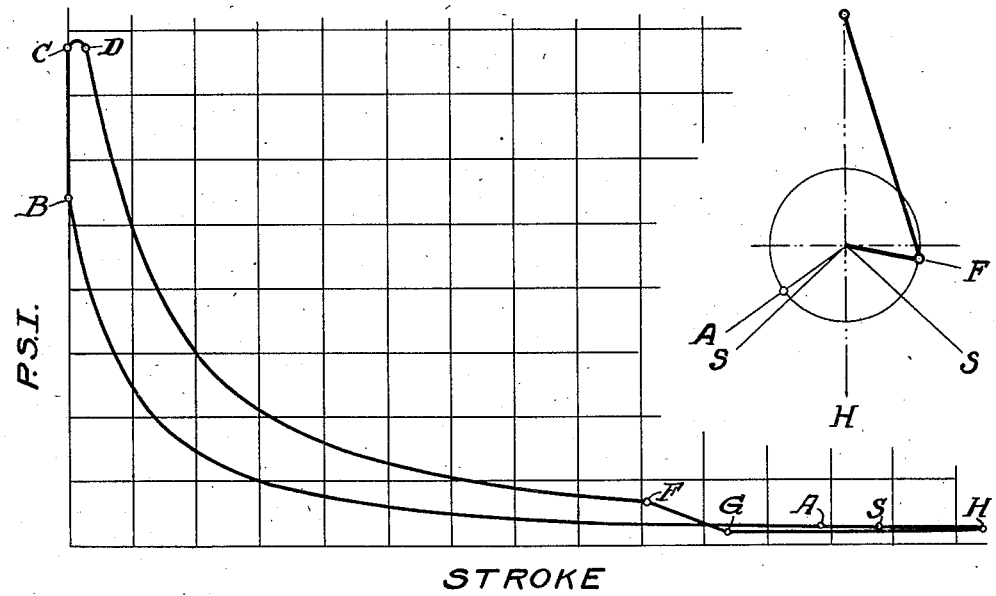
Figure 4 is an indicator card for half or low load with corresponding crank diagram.

1 is an internal combustion engine cylinder, 2 the cylinder head, 3 the piston, 4 scavenging ports in the cylinder wall adapted to be opened and closed by the piston and communicating with a scavenging manifold 5. 6 is an exhaust port in the cylinder head controlled by the exhaust valve 7. The exhaust valve 7 is carried by a valve stem 8 biased to closed position by the spring 9 and adapted to be opened by hydraulic plunger 10 in the cylinder 11. The cylinder 11 is supported by the cage 12 on the cylinder head 2. 120 is a duct containing hydraulic fluid under high pressure. 13 is a pipe leading from the duct 120 to the valve housing 14. 15 is a pipe leading from the valve housing 14 to the cylinder 11. 16 is a control or shuttle valve biased to closed position by the spring 17. The valve 16 when open provides a passage from duct 120, through duct 13, valve housing 14, duct 15 to cylinder 11 above plunger 10. This permits pressure from duct 120 to force plunger 10 down to open valve 7. When valve 16 is closed, duct 13 is closed and duct 15 discharges through housing 14 and passage 18 to permit spring 9 to close valve 7. Valve 16 is exposed to pressure through duct 20 from cylinder of timing pump 21. The details of the valve forming no part of the invention are in the interest of clearness omitted. Cylinder 21 contains plunger 22 carrying cam engaging member 23, having cam roller 24 in engagement with cam 25 on cam shaft 26 actuated by the engine. Plunger 22 is rotatable as well as reciprocable. A gear 230 mounted on plunger 22 is engaged by a rack 240 adapted to be actuated by control link 250 leading to the load control on a governor or other suitable control so that movement of link 250 rotates plunger 22, the gear 230 being of such width that no matter what the position of the plunger, the gear 230 and the rack 240 are in mesh. The plunger 22 terminates in inclined or spiral head 260. Hydraulic fluid may enter the cylinder 21 from the low pressure duct 27 through duct 28 and port 29 in the cylinder 21. As the plunger 22 reciprocates under the influence of the cam 25, the time at which pressure is applied through the duct 20 from the cylinder 21 to displace valve 16 depends upon the angular position of the plunger 22. When the angular position of the plunger 22 varies, the point at which the port 29 is closed varies with respect to plunger movement. As soon as port 29 is closed, pressure is applied to displace valve 16.

This mechanism makes it possible for the time when the exhaust valve 7 is opened to be controlled in consonance with the engine load control so that at light loads or starting, the exhaust valve may open early in the engine cycle before the contents of the cylinder have expanded. As load increases, the time when valve 7 opens will be retarded until at maximum load valve 7 only opens after the completion of the normal expansion stroke of the engine.

In Figure 2, 35 is the governor, driven by the engine, the details not being shown. The governor has not been illustrated in detail, however, it should be understood that it may be any conventional type that controls or maintains the speed of the engine approximately constant in response to load variation, the engine being primarily of the constant speed variety with load variations from no load to full load and the overloads, in a conventional manner. The governor, besides actuating the rack 240 to rotate the gear 230 in response to load variations to open and close the valve 7, also actuates a rack 36 to operate the injection pump 37 drawing fuel from the supply line 38 and discharging it through the duct 39 to the nozzle 40. Exhaust gas is discharged through the duct 41 to the turbine 42, the turbine driving the blower 43, to supply scavenging and supercharging air under pressure through the duct 45 to the scavenging manifold 5.

In order that the time of closing of the exhaust valve may vary in consonance with the change of time of opening, the plunger 22 may have below its head a spiral groove 46 adapted to control a port 47 in the cylinder 21 so that as the plunger 22 reciprocates, it closes and opens successively the ports 29 and 47. Rotation of the plunger controls the time of opening and closing of the exhaust port.

Figure 5:
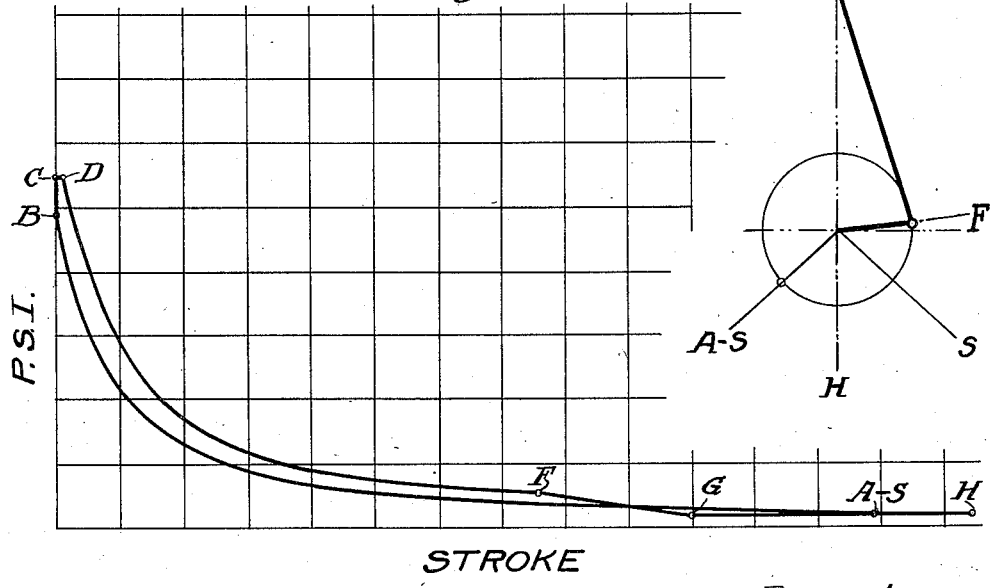
Figure 5 is an idling indicator card with corresponding crank diagram.

The timing of the opening and closing of the exhaust port for full or overload, low or half load and idling is illustrated respectively in Figures 3, 4 and 5. In each figure, A is the point at which the exhaust valve closes and compression starts; B the point at which compression ends and combustion is in process; between C and D peak combustion, pressure and temperature are obtained; from D to F expansion continues; F is the point at which the exhaust valve opens; G is the approximate end of exhaust blow down and H the end of the stroke. Scavenging starts and ends always at the same point S where the scavenge ports are uncovered by the piston and is from S to H to S.

The PV diagrams in Figures 3, 4 and 5 point out the relationship between the time of opening and time of closing of the exhaust valve and emphasize the fact that lead opening and closure angles vary with load and that the variation is not necessarily constant, that is lead opening angle and closure angle of crank shaft movement may vary uniformly or differentially depending on engine design, the essential thing being that as exhaust opening advances so does exhaust closing but not necessarily at the same rate.

For starting, since it takes substantial power to bring the engine up to full speed, half or low load conditions prevail and the diagram of Figure 4 would reflect conditions as the engine comes up to speed. When the engine has reached speed before load is applied, then conditions will be such as indicated in Figure 5 and as load builds up, conditions approach the conditions of overload shown in Figure 3.

When load falls and less fuel is burned, the exhaust valve opens earlier and energy otherwise applicable to move the piston is bled off from the power cylinder and supplied to the turbo-charger and the exhaust valve closes earlier so as to compensate for the reduction in pressure level of the cycle to a point where enough air is retained in the cylinder to initiate and support combustion. This change in relationship continues as load goes down until we reach the point of idling where the exhaust valve actually opens about ninety-three degrees or more before lower dead center, and closes at approximately the time that the scavenging ports close.

Referring to Figure 6, it will be understood that the line X, Y, Z indicates fuel consumption as load falls without reference to change in timing of the opening and closing of the exhaust valve and without reference to any additional fuel charge. From X to Y, any load variation does not appreciably affect the operation of the turbo-charger. From Y to Z the usual supply of fuel to the engine is not sufficient to furnish adequate power to drive the engine and supply adequate scavenging and supercharging air. The amount of fuel must therefore increase from Y to Z'. Y may coincide with X or may assume a position somewhere between X and Z. At all times as load falls the total fuel is less than the fuel required for a higher load but the decrease in fuel is less than it would be without variable exhaust lead for any given load.

It will be understood that the above description and the drawings on which it is based are illustrative and relatively diagrammatic, and are not intended to limit the application of our invention merely to two-cycle practice.

It should also be understood that the invention is obviously applicable to a multi-cylinder engine with any suitable number of cylinders, although, for simplicity, I have only shown a single cylinder in the drawings. In a multi-cylinder engine, each cylinder would have a mechanism for varying the time of opening of its exhaust valve or port so that the products of combustion would be allowed to escape to the exhaust drive supercharger with increased energy at the lower loads. The valve timing means should be tied to a factor indicative of load, for example the governor. The means for supplying fuel to the cylinder should also be tied to a load factor so that at lower loads auxiliary or additional fuel would be supplied to compensate for the energy subtracted from the power stroke. In the disclosed embodiment, in Figure 2, for example, the rack 240 tied to the governor 35 only controls the valve actuating mechanism 21 and the fuel pump 37 for one cylinder. But the same rack could be used to actuate any number of fuel pumps and valve actuating mechanisms.

We claim:

1. An internal combustion engine having at least one cylinder, inlet and exhaust port means for each cylinder, and an exhaust driven supercharger; a method of operating such an engine including the steps of changing the time of opening of the exhaust port means for each cylinder in direct relation to the load during the power stroke, the time of opening being advanced as the load decreases and retarded as the load increases so that the temperature and pressure of the exhaust gases will be increased at the lower loads, and increasing the amount of fuel supplied to the cylinders at the lower loads above the normal amount so as to maintain adequate power development during the power stroke.

2. The method of claim 1 characterized by and including the step of varying the volume of air entrapped for compression in the cylinders in direcct relation to the load, the volume being decreased as the load increases and vice versa.

3. In an internal combustion engine having exhaust and inlet ports and means for opening and closing them, a turbo-charger connected to receive exhaust gas from the engine and to supply scavenging and supercharging air to the engine, means responsive to load conditions for advancing the time of opening of the exhaust port as load decreases, and means for increasing the supply of fuel to the engine responsive to load conditions to compensate for the energy subtracted from the power stroke and supplied to the turbine of the turbo-charger as a result of the earlier opening of the exhaust port.

4. The structure of claim 3 further characterized in that the turbo-charger supplies air at a pressure and temperature that vary the load so that as the load rises, the pressure and temperature of the inlet air rise and vice-versa, the inlet ports for admitting the scavenging and supercharging air being disposed around the wall of the cylinder, each exhaust port being disposed in the cylinder head, the engine being constructed to operate on a two stroke cycle.

5. In an internal combustion engine having exhaust and inlet ports and means for opening and closing them, a turbo-charger connected to receive exhaust gas from the engine, and to supply scavenging and supercharging air to the engine, means responsive to load conditions for advancing the time of opening of the exhaust port as load decreases and for delaying the time of opening as the load increases, and means for varying the supply of fuel to the engine responsive to load conditions, to compensate for the variation, resulting from change in time of opening the exhaust port, in the relative amount of energy supplied to the power stroke and to the turbo-charger.

6. In an internal combustion engine having exhaust and inlet ports and means for opening and closing them, a turbo-charger connected to receive exhaust gas from the engine and to supply scavenging and supercharging air to the engine, means responsive to load conditions for advancing the time of opening and the time of closing of the exhaust port as the load decreases, and means responsive to load conditions for varying the supply of fuel to the engine, to compensate for the variation, resulting from the change in time of opening of the exhaust port, in the relative amount of energy supplied to the power stroke and to the turbo-charger.

7. The structure of claim 6 further characterized and arranged in that the inlet ports for admitting scavenging and supercharging air are disposed around the wall of each engine cylinder, and the exhaust ports are positioned in the cylinder head so that the engine is a uniflow scavenging two cycle engine.

8. In an internal combustion engine, having exhaust and inlet ports and means for opening and closing them, a turbo-charger connected to receive exhaust gas from the engine and to supply scavenging and supercharging air to the engine, means responsive to load conditions for advancing the time of opening of the exhaust port as load decreases, and means for increasing the amount of fuel supplied to the engine, responsive to load conditions, in such amount as to compensate for the energy diverted from the power stroke and supplied to the turbine of the turbo-charger as a result of the earlier opening of the exhaust port, thereby maintaining the power developed in the power stroke adequate to sustain engine load and speed.

9. In an internal combustion engine having a plurality of cylinders, exhaust and inlet ports, means for opening and closing them, at least one turbo-charger connected to receive exhaust gases from all of the cylinders and to supply scavenging and supercharging air to the engine, means responsive to load conditions for varying the time for opening the exhaust ports in direct relation to the load, the time of opening being advanced as the load decreases and retarded as the load increases, and means responsive to load conditions for increasing the supply of fuel to the engine as the load decreases, above the amount normally supplied, to compensate for the energy subtracted from the power stroke of the piston as a result of the earlier opening of the exhaust ports.

10. The structure of claim 9 further characterized by and including means for varying the volume of air entrapped for compression in the cylinder in relation to load variations.

11. In an internal combustion engine, at least one turbo-charger connected to receive exhaust gas from all of the cylinders and to supply scavenging and supercharging air to the cylinders, valve timing means for varying the effective expansion ratio of the engine in response to load conditions so that the temperature and pressure of the exhaust gas supplied to the turbo-charger will be increased at the lower loads, and means for increasing the supply of fuel to the cylinders above that normally supplied at the lower loads to compensate for the energy diverted from the power stroke by the shorter effective expansion ratio.

References Cited in the file of this patent

UNITED STATES PATENTS

| | | |
|---|---|---|
| 1,856,024 | Büchi | Apr. 26, 1932 |
| 2,067,288 | Riehm | Jan. 12, 1937 |
| 2,090,877 | Small | Aug. 24, 1937 |
| 2,097,883 | Johansson | Nov. 2, 1937 |
| 2,281,987 | Oswald | May 5, 1942 |
| 2,401,188 | Prince | May 8, 1946 |
| 2,444,644 | Fullemann | July 6, 1948 |
| 2,578,028 | Udale | Dec. 11, 1951 |
| 2,602,434 | Barnaby | July 8, 1952 |
| 2,731,792 | Nallinger | Jan. 24, 1956 |